May 11, 1937.   E. F. ROSSMAN   2,079,771
VALVE FOR SHOCK ABSORBERS
Filed Jan. 24, 1936

INVENTOR
EDWIN F. ROSSMAN
BY
Spencer, Hardman and Fehr
ATTORNEYS

Patented May 11, 1937

2,079,771

UNITED STATES PATENT OFFICE 2,079,771

VALVE FOR SHOCK ABSORBERS

Edwin F. Rossman, Dayton, Ohio, assignor to General Motors Corporation, Detroit, Mich., a corporation of Delaware Application January 24, 1936, Serial No. 60,647

10 Claims. (Cl. 188—88)

This invention relates to improvement in hydraulic shock absorbers.

It is among the objects of the present invention to provide a double-acting shock absorber with fluid flow control devices of simple structure and design, certain of which are adapted to replenish the fluid supply in the fluid displacement chambers of the shock absorber and thus compensate for fluid losses caused by leaks past the piston.

A further object of the present invention is to provide a shock absorber with a replenishing valve, constructed as a unit, which may be inserted into the shock absorber as a complete assembly.

These and other objects of the invention are attained by providing a double-acting hydraulic shock absorber, having a fluid reservoir and two fluid displacement chambers, with fluid flow control devices or spring-loaded valves adapted to be actuated by fluid pressure in each of said valve chambers to permit a controlled flow of fluid from said chambers, and with another fluid flow controlling means constructed as a unit, and adapted normally to shut off the displacement chambers from the reservoir, said means being adapted also to be actuated by the fluid pressure in either one of the chambers to open the other displacement chamber to the reservoir and thus permit fluid to flow from said reservoir into said chamber.

Further objects and advantages of the present invention will be apparent from the following description, reference being had to the accompanying drawing, wherein a preferred embodiment of the present invention is clearly shown.

Figures 1, 3, 4:
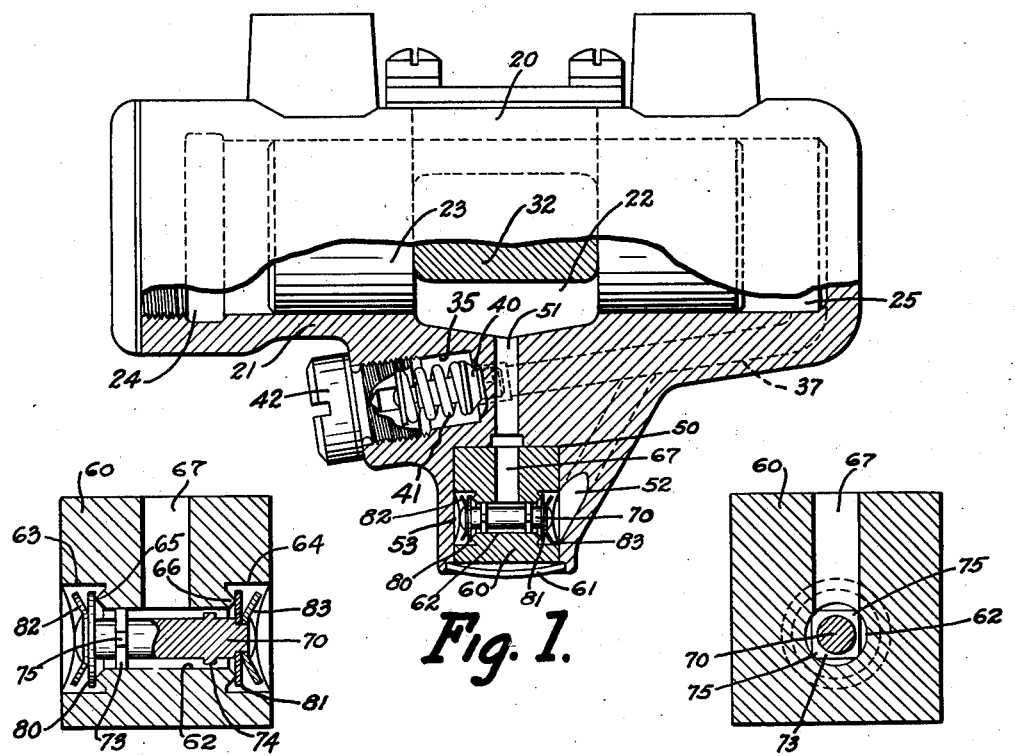
Fig. 1 is a plan view of the shock absorber, partly in section, illustrating the fluid replenishing valve unit in position within the shock absorber.
Fig. 3 is a longitudinal sectional view of the fluid valve on an enlarged scale.
Fig. 4 is a view, illustrating the valve in longitudinal cross section taken transversely to that of Fig. 3.

Referring to the drawing, the hydraulic shock absorber is shown comprising a casing 20 providing a cylinder 21 and a fluid reservoir 22. Within the cylinder 21 a piston 23 is provided, which forms displacement chambers 24 and 25 at opposite ends of the shock absorber.

A shaft 30 is journalled transversely of the shock absorber, one end thereof extending outside the shock absorber and having the operating arm 31 secured thereto. Within the casing, shaft 30 has an operating cam 32 anchored thereto, this cam extending into a recess in the piston whereby oscillations of the cam 32 will reciprocate piston 23 in the cylinder 21.

Two valve chambers 35 and 36 are provided in the casing, valve chamber 35 being in communication with the displacement chamber 25 through the duct or passage 37. The valve chamber 36 is in communication with the displacement chamber 24 through the duct or passage 38. Both valve chambers 35 and 36 are provided with spring-loaded check valves which are identical, and only one will be described for the sake of brevity.

Referring to Fig. 1, the valve in the chamber 35 is designated by the numeral 40. This valve is urged upon its seat to shut off chamber 35 from duct or passage 37 by a spring 41, one end of which engages the valve, the other abutting against the inner end of the screw plug 42 threadedly received in the outer end of valve chamber 35. For purposes of description the valve in chamber 36 corresponding to valve 40 in chamber 35 is designated by the numeral 46. Valve chamber 35 is in communication with duct 38 through a passage 47 while a similar passage 48 provides communication between valve chamber 36 and the duct or passage 37. Both valves 40 and 46 normally shut off communication between their respective valve and displacement chambers 25 and 24, but may be actuated by fluid pressure to permit fluid to flow from their respective displacement chambers to the displacement chamber at the opposite end of the shock absorber.

A recess 50 is provided in the shock absorber casing for receiving the fluid replenishing valve. This recess is in communication with the fluid reservoir 22 via the passage 51, which opens into the bottom end of the recess. Duct or passage 37 also communicates with the reservoir through the passage 52 which opens into the annular side wall of recess 50. A similar duct or passage 53 provides communication between the displacement chamber 24 and the reservoir 50, this duct or passage 53 also opening into the cylindrical side wall of the recess 50.

The means normally closing the displacement chambers from the reservoir but adapted to be actuated by the pressure in one of the displacement chambers to connect the other with the reservoir, which means may be termed the "fluid replenishing valve", comprises a block 60 adapted to fit into the recess 50, being held therein in any suitable manner for instance, by an expansible plug or disc 61, as shown in Fig. 1. This block 60 has a passage 62 transversely thereof, providing communication between the two ducts or passages 52 and 53. Adjacent the outer surface of the block 60, passage 62 is counter-bored as at 63 at one end and 64 at the other. In the bottom of each counter-bore there is provided an annular ridge, one designated by the numeral 65, the other by the numeral 66, these annular ridges forming valve-seats in their respective counter-bored portions of passage 62. A longitudinal passage 67 communicates with the transverse passage 62, this passage 67 aligning with the passage 51 in the casing when the block is placed in position in the shock absorber casing.

A valve stem 70 is slidably supported within the passage 62, the diameter of this valve stem being considerably less than the diameter of the passage 62 so as to permit fluid flow past the stem. In order to support the stem 70 slidably within the passage 62, two spaced flanges 73 and 74 are provided on the stem, rectangular in shape, as shown in Fig. 4, the corners of the rectangle being rounded as at 75 in Fig. 4 forming bearings which slidably engage the inner wall of the passage 62. At each end of the stem there is provided a flexible disc, the one being designated by the numeral 80, the other at the opposite end being designated by the numeral 81. On top of the disc the stem carries a saucer-shaped backing plate, the one for disc 80 being designated by the numeral 82 and for the disc 81 being designated by the numeral 83. These discs and backing plates are securely held upon the stem 70 by peening the ends of the stem over the respective backing plates. When properly assembled upon the stem 70, discs 80 and 81 normally engage valve seats 65 and 66 respectively, thereby shutting off communication between the counterbored portions 63 and 64 and the main or central portion of the passage 62, and consequently when this unit is in position on the shock absorber casing as shown in Fig. 1, communication between the respective passages 52 and 53 and the reservoir passage 51 will likewise be cut off.

Figure 2:
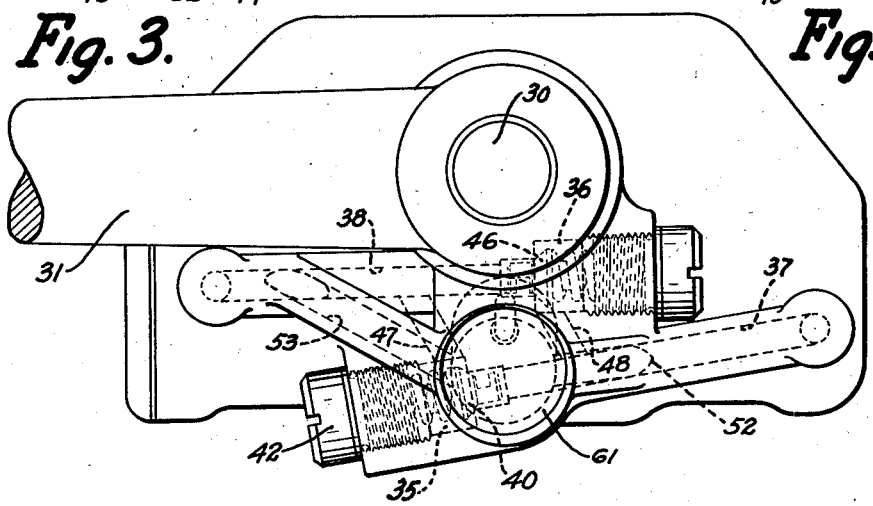
Fig. 2 is a front elevation of the shock absorber.

It will be seen that as the arm 31 is moved upwardly or clockwise as regards Fig. 2, the piston 23 will be moved toward the left (see also Fig. 1), consequently the fluid in chamber 24, having pressure exerted thereupon, will flow through duct or passage 38, urge valve 46 from its seat, which permits the fluid to flow into chamber 36, from where it will flow through passages 43 and 37 to the chamber 25. In a similar manner as arm 31 is moved downwardly, or counter-clockwise as regards Fig. 2, piston 23 will be moved toward the right and, due to pressure thereupon, fluid in chamber 25 will be urged through passage 37 against valve 40 which, when moved from its seat by a predetermined fluid pressure, will permit the fluid to flow into chamber 35, from where the fluid will flow through passages 47 and 38 to the chamber 24. It has been found that a certain amount of fluid will leak past the piston as it exerts pressure upon the fluid in a displacement chamber and consequently a full supply of fluid will not be delivered to the opposite displacement chamber. To compensate for this loss of fluid, a replenishing valve is provided which, when the piston moves toward the left, exerting a pressure upon the fluid in chamber 24, will cause fluid to flow through passage 53, exerting a pressure upon the end of the replenishing valve, causing the disc-valve 80 to be flexed as it is urged more tightly upon its seat 65, thereby causing the entire valve assembly to move bodily toward the right, which will lift disc-valve 81 from its seat 66 to connect the duct 52 with passages 62 and 67 in communication with the reservoir 22 through the passage 51 in the casing. Under these circumstances the right end of the piston moving toward the left and creating a suction in chamber 25 will tend to draw fluid from the reservoir 22 through passages 51, 67 and 62, past the disc-valve 81 through the counterbore 64, ducts or passages 52 and 37 to replenish any fluid losses caused by leaks past the piston and to add to the fluid supply coming from chamber 24 under these circumstances, for the purpose of completely filling chamber 25. Under the same circumstances as the piston moves toward the right to exert a pressure upon fluid in chamber 25, the replenishing valve will be moved toward the left as regards Figs. 1 and 3, thus flexing disc-valve 81, moving disc-valve 80 from its seat 65 and thus permitting fluid to flow from the reservoir 22 to the chamber 24.

The replenishing valve is completely assembled in valve block 60 and thus is inserted into the shock absorber as a complete assembly.

This replenishing valve is actuated by the fluid pressure in one chamber to bring the opposite chamber into communication with the reservoir for purposes of fluid replenishment. It is of simple construction and the nature of the construction renders it substantially noiseless.

Thus applicant has provided an hydraulic shock absorber having a fluid reservoir 22 and two fluid displacement chambers 24 and 25, fluid flow from said chambers being adapted to be established and controlled by the spring-loaded pressure relief valves 40 and 46, the shock absorber having means in the form of a replenishing valve within block 60 which is adapted to act in response to fluid pressure in either chamber 25 or 24 to open the opposite chamber, thereby permitting fluid to flow from the reservoir 22 into said opposite chamber for purposes of replenishing the fluid supply, compensating for any fluid leaks which may have occurred past the shock absorber piston.

While the embodiment of the present invention constitutes a preferred form, it is to be understood that other forms might be adopted, all coming within the scope of the claims which follow.

What is claimed is as follows:

1. In a hydraulic shock absorber having a fluid reservoir and two fluid displacement chambers, the combination with a spring-loaded valve adapted to control the flow of fluid from each displacement chamber; of means normally closing each of said chambers from the reservoir but adapted to be actuated by a slight fluid pressure in one chamber to open the other chamber only to the reservoir.

2. In a hydraulic shock absorber having two fluid displacement chambers, the combination with a reservoir; communicating ducts connecting both displacement chambers with the reservoir; and means normally closing communication between said ducts to shut off both chambers from the reservoir but adapted to be actuated by a slight fluid pressure in one displacement chamber to establish communication between the other displacement chamber only and the reservoir.

3. In a hydraulic shock absorber having two fluid displacement chambers, the combination with a reservoir; of ducts connecting the reservoir and displacement chambers; and a unitary valve mechanism normally shutting off the reservoir from both said chambers, but adapted to be actuated by a slight fluid pressure in the one chamber to connect only the other chamber with the reservoir.

4. In a hydraulic shock absorber having two fluid displacement chambers, the combination with a reservoir; of ducts connecting the reservoir and displacement chambers; yieldable means normally closing all of said ducts from each other and adapted to be flexed by a slight fluid pressure in one duct to open the other ducts to each other and connect the reservoir and a displacement chamber.

5. In a hydraulic shock absorber having two fluid displacement chambers, the combination with a reservoir; of ducts connecting the reservoir and displacement chambers; a flexible means normally closing each duct; means tying both flexible means together whereby when one flexible means is flexed by fluid pressure in its duct, the other flexible means is actuated to open its duct.

6. In a hydraulic shock absorber having two fluid displacement chambers, the combination with a reservoir; of ducts connecting the reservoir and displacement chambers; a flexible disc valve in each duct; a rigid stem supporting said disc valves so that each valve normally closes communication between its duct and the reservoir; said stem moving one disc valve to open communication between the duct of said valve and the reservoir in response to the flexing of the other disc valve by the fluid pressure in its duct.

7. A hydraulic shock absorber comprising, in combination, a casing providing a fluid reservoir and a cylinder in which a piston forms two fluid displacement chambers, said casing having a recess communicating with the reservoir; a duct leading from each displacement chamber into the recess; a block in said recess, having passages connecting the two ducts with the reservoir; and a unitary valve mechanism in a passage of the block, normally shutting off both ducts from the reservoir, but adapted to be actuated by the fluid pressure in one duct to open the other duct to the reservoir.

8. A hydraulic shock absorber comprising, in combination, a casing providing a fluid reservoir and a cylinder in which a piston forms two fluid displacement chambers, said casing having a recess communicating with the reservoir; a duct leading from each displacement chamber into the recess; a block in said recess, having passages connecting the two ducts with the reservoir; and a unitary valve mechanism in a passage of the block, comprising two flexible disc valves secured to the opposite ends of a stem, said disc valves normally closing the ducts from communication with the reservoir, each disc valve being adapted to be flexed by fluid pressure in its duct to move the other disc valve to open its duct to the reservoir.

9. A hydraulic shock absorber comprising, in combination, a casing providing a fluid reservoir and a cylinder in which a piston forms two fluid displacement chambers, said casing having a recess and a passage connecting said recess with the reservoir; a duct leading from each displacement chamber into the recess; a block in said recess, having a transverse passage communicating with both ducts and a central passage connecting the transverse passage and the passage in the casing leading from the recess to the reservoir; two oppositely disposed annular ridges in the transverse passage, forming valve-seats; a stem slidably carried in said transverse passage and formed to permit fluid flow through said passage; a disc valve at each end of said stem, each valve normally engaging a valve-seat and being adapted to be urged against the valve-seat and be flexed by fluid pressure in the adjacent duct to actuate the stem and move the opposite disc-valve from its valve-seat.

10. In a hydraulic shock absorber having a fluid reservoir and two fluid displacement chambers, the combination with means adapted to be actuated by fluid pressure to provide for a flow of fluid from a displacement chamber; of means comprising resilient members normally shutting off the respective chambers from the reservoir, but adapted to be flexed by the fluid pressure in one chamber to open the other chamber to the reservoir.

EDWIN F. ROSSMAN.